Jan. 7, 1941.　　　M. H. GROVE　　　2,227,542
VALVE CONSTRUCTION
Filed Oct. 4, 1939　　2 Sheets-Sheet 1
FIG_1_
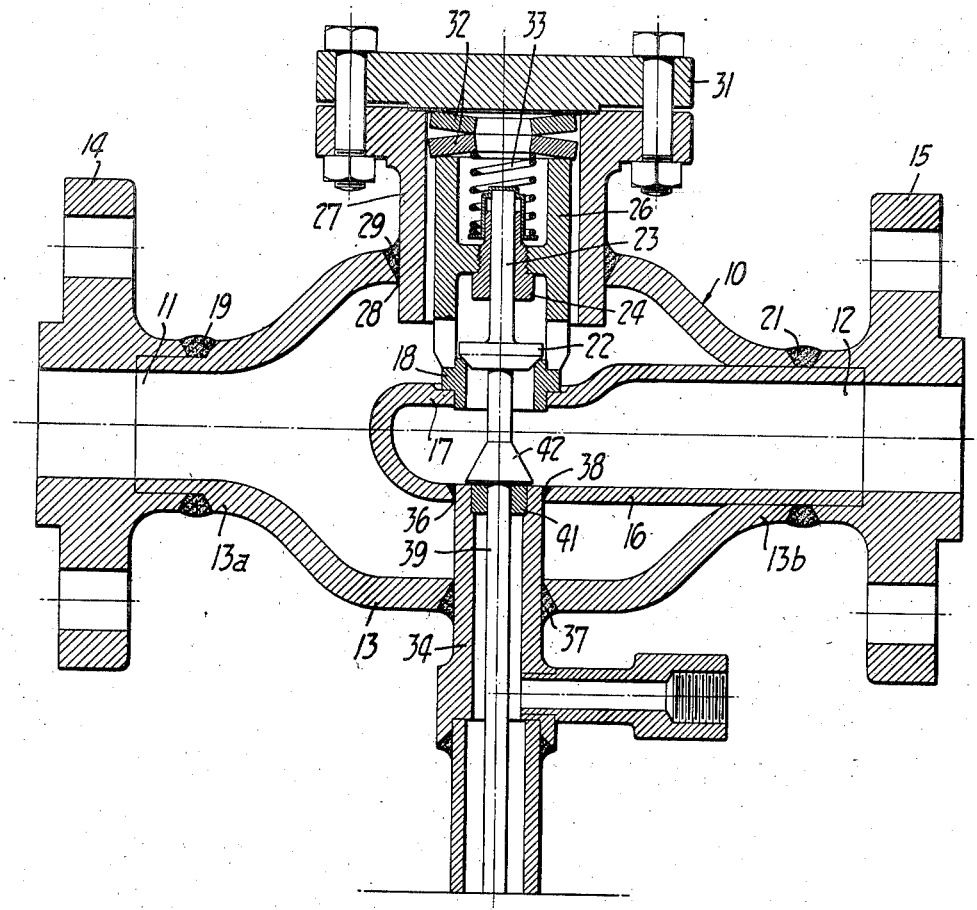
INVENTOR
*Marvin H. Grove*
BY
ATTORNEY Jan. 7, 1941. M. H. GROVE 2,227,542
VALVE CONSTRUCTION
Filed Oct. 4, 1939 2 Sheets-Sheet 2
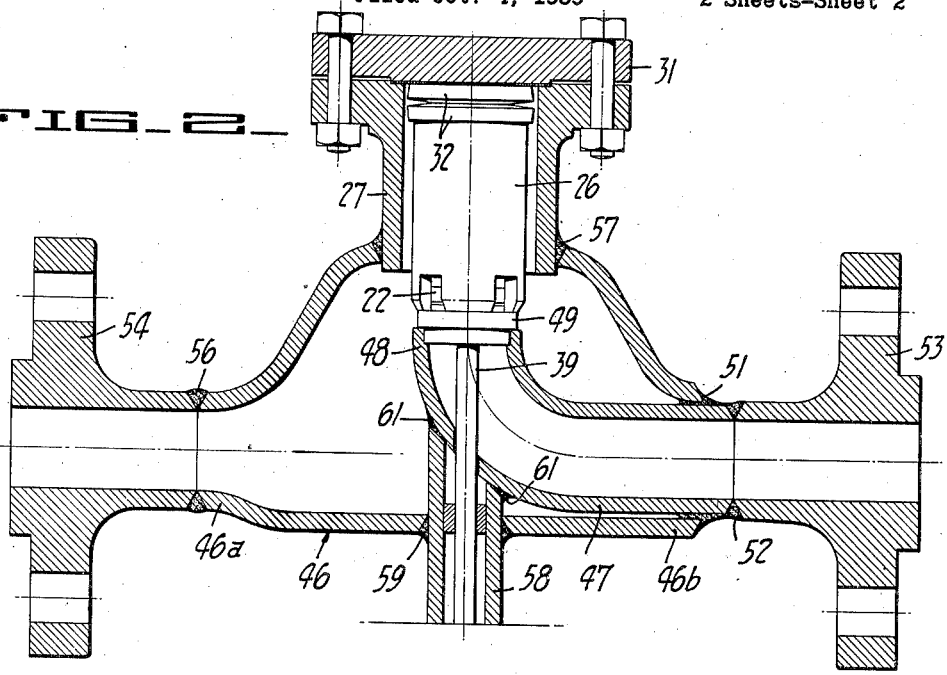
FIG_2_
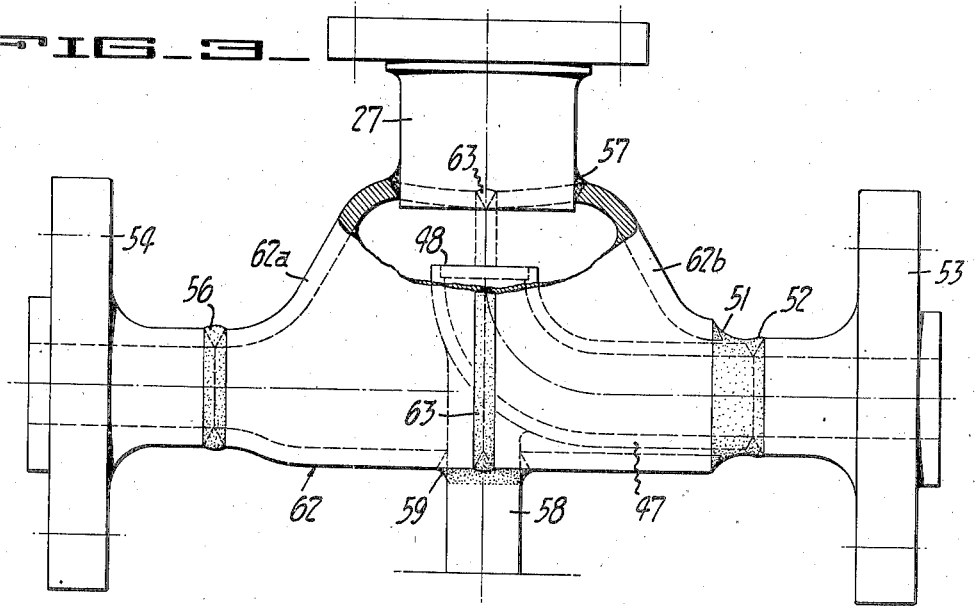
FIG_3_
INVENTOR
Marvin H. Grove
BY
ATTORNEY Patented Jan. 7, 1941

2,227,542

UNITED STATES PATENT OFFICE 2,227,542

VALVE CONSTRUCTION

Marvin H. Grove, Berkeley, Calif.

Application October 4, 1939, Serial No. 297,857

3 Claims. (Cl. 251—155)

This invention relates generally to the construction of valves for controlling flow of fluid.

It is a primary object of the invention to provide an improved type of valve body formed of metal parts fabricated by welding, as distinguished from conventional cast or forged metal bodies.

A further object of the invention is to provide an improved manner of providing a bridge within a valve body, whereby a convenient exterior weld retains the bridge in place.

Additional objects of the invention will appear from the following description in which the preferred embodiment of the invention has been set forth in detail in conjunction with the accompanying drawings.

Referring to the drawings:

Figure 1 is a side elevational view in cross section constructed in accordance with my invention.

Figure 2 is a view similar to Figure 1 but showing a modification of construction.

Figure 3 is a view similar to Figure 2 but showing a further modification.

The valve construction illustrated in Figure 1 makes use of a fabricated body 10 having inflow and outflow passages 11 and 12. The parts from which this body is constructed consist of the intermediate portion 13, the end coupling members 14 and 15, and the inner bridge 16. The intermediate portion 13 is preferably formed from a piece of ordinary steel tubing which has its ends swaged down to form portions 13a and 13b of reduced diameter. Couplers 14 and 15 are parts of simple design such as can be manufactured in large quantities at low cost, or purchased upon the open market. Generally, such parts are made from steel forgings, with suitably machined faces to facilitate making sealed connection with inflow and discharge piping. Where flanged couplers are not desired, it is apparent that other types of coupling members can be used, as for example, members adapted to make threaded connection with pipes.

The bridge 16 is generally in the form of a tube having its inner end closed and fitted within the end portion 13b. One wall portion 17 of the bridge is flattened and machined to receive the seat ring 18.

The portions described above are all secured together by suitable weld connections. Thus, a weld 19 connects coupler 14 with the end portion 13a, while weld connection 21 connects the end portion 13b with the other coupler 15, and also preferably with the bridge 16. It will be evident that the parts must be retained in suitable alignment at the time these weld connections are made.

In a typical instance the body described above is utilized in conjunction with a valve member moving between open and closed positions with respect to the seat ring 18, and is operated as by applied fluid forces, through an operating diaphragm, or manually. Thus, as representative of a complete valve construction, I have shown a valve member 22 cooperating with the seat ring 18 and having a stem 23 guided within the bushing 24. This bushing is in turn carried by sleeve 26, the lower end of which engages the seat ring 18. The sleeve 26 is accommodated within a flanged nipple 27, which is positioned within an opening 28 in the upper side of the valve body, and secured in such position by the weld connection 29. A closure plate 31 is removably attached to the outer end of nipple 27, and interposed between this plate and the upper end of sleeve 26 are the Bellville springs 32. These springs exert sufficient force to adequately hold down the seat 18 upon the bridge, while at the same time permitting the sleeve 26 to take a position to properly align the valve 22 with respect to its seat, as determined by the machining of the seat ring and the machining of the bridge wall 17. A compression spring 33 serves to urge the valve member 22 towards its seat.

Extending through the opposite or lower side of the valve body there is a tube 34, the upper end of which extends through an opening 36 in the lower side of the bridge 16. Weld connections 37 and 38 serve to attach this tube to the adjacent walls of the body, and to the bridge. A slidable actuating rod 39 is shown extending through tube 34 with the upper end of this rod engaging the valve member 22. Bushing 41 is shown as guide means for the rod, and a conical deflector 42 is shown carried by the rod to prevent fluid from flowing down through the clearance between the rod and the bushing 41. Suitable means can be employed to prevent leakage through the nipple 34 and about the rod 39, as for example a conventional stuffing gland or a diaphragm. The outer end of the rod can be connected to suitable operating means, for manual, automatic or remote control operation.

Aside from providing access into the body, tube 34 serves to effectively stiffen and reinforce the assembly. Its rigid attachment by weld connections to both the body and bridge tube 17 enables the bridge to withstand the downward thrust required to hold seat ring 18 in place, without displacement or deflection of the bridge with respect to the body.

It will be apparent that the valve construction described above has certain inherent advantages. They can be manufactured without resort to expensive patterns or dies for forming a bridge integral with the remainder of the body, by forging or casting operations. Such patterns or dies may involve a large capital investment, particularly when it is necessary to manufacture valves in a large number of sizes. My fabricated construction does not make use of unnecessary excessive metal such as merely increases the weight of the valve without inherently increasing the strength. Therefore, for this reason and also because my valve can be made of strong materials such as suitable steel or alloys, my valve body for a given size of valve and for a given pressure, is considerably lighter in weight than valve bodies of conventional construction. Fabrication of the parts described above offers no serious difficulties, and can be carried out with a reasonable degree of accuracy. Virtually all of the machining operations necessary, including the machining of the couplings 14, 15, and the nipples 27 and 34, can be carried out before the body is fabricated. One can carry out the machining operations upon the bridge wall 17, to provide a proper seal with respect to the seat ring 18, after the parts of the body have been assembled and welded together, by tools applied through the nipple 27.

In the present instance I have illustrated and described a single acting valve in conjunction with the bridge 16. As is well known to those skilled in the art, such a bridge can also be utilized with a so-called double or balanced valve construction.

Figure 2 illustrates a modified type of construction which also makes use of a fabricated body. Thus, in this instance the intermediate part 46 is swaged eccentrically to provide the end portions 46a and 46b of reduced diameter. The bridge tube 47 is curved so that its inner end 48 faces upwardly, where it is provided with a seat ring 49. The weld connection 51 serves to connect the reduced end portion 46b with the bridge tube, while another weld connection 52 makes connection between tube and the flanged coupling 53. The other flanged coupling 54 connects to the reduced end portion 46a, by the weld connection 56. The nipple 27 extends into the upper side of the body and is secured to the main portion of the body by the weld connection 57. The valve member 22 cooperates with the seat ring 49, and is associated with other parts substantially as in Figure 1. A tube 58 extends through the lower side of the body and is secured to both the wall of the body and to the bridge tube 47, by the weld connections 59 and 61. The actuating rod 39 extends through tube 58 and engages the lower end of the valve member 22.

Figure 3 illustrates a modification of Figure 2 in which the intermediate portion of the valve body is formed of two parts 62, formed of tube sections swaged to form the reduced end portions 62a and 62b. These two parts are connected together by means of the weld connection 63, thereby forming in effect a body substantially the same as Figure 2.

I claim:

1. In a valve body construction, a tubular member the ends of which form inlet and outlet passages, a tubular bridge extending through one end of said tubular member, and a third metal tube extending through one side of the body, the third tube having weld connections to both the first tube and to the inner end portion of the tubular bridge and serving to provide access into the bridge and to brace the bridge with respect to the first named tube.

2. In a valve construction, a main tubular body portion having ends forming inlet and outlet passages, a tubular bridge extending through one end of said main body portion, the inner end of said tubular bridge having one side of the same formed to provide a valve seat, and a third metal tube extending through one side of the body portion and in substantial alinement with said seat, said third tube having weld connections to the body portion and also to the inner end of the tubular bridge upon that side of the tubular bridge opposite from the valve seat, the third tube serving to provide a passage for access into the bridge and also serving to brace the bridge with respect to the body portion.

3. In a valve body construction, a swaged metal tube, the ends of which form inlet and outlet passages, one of the ends being of reduced diameter, a tubular bridge extending through said one end of the first named tube, the inner end of the tubular bridge on one side of the same being formed to provide a valve seat, a third metal tube substantially alined with respect to the valve seat and extending through one side wall of the body, the third tube having weld connections to both the first tube and to the inner end portion of the tubular bridge on that side of the tubular bridge diametrically opposite from the valve seat, said third tube serving to provide a passage for access into the bridge and also serving to brace the bridge with respect to the first tube.

MARVIN H. GROVE.